(12) United States Patent
Furue et al.

(10) Patent No.: US 7,899,284 B2
(45) Date of Patent: *Mar. 1, 2011

(54) PROCESS FOR PRODUCING OPTICAL CONNECTOR, APPARATUS FOR PRODUCING THE SAME, AND PROCESS FOR FORMING POLYMER COATING

(75) Inventors: Tomoki Furue, Shizuoka-ken (JP); Ken Sukegawa, Shizuoka-ken (JP); Kyoichi Sasaki, Shizuoka-ken (JP); Masayoshi Suzuki, Fujieda (JP)

(73) Assignee: Tomoegawa Co., Ltd., Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 12/178,996

(22) Filed: Jul. 24, 2008

(65) Prior Publication Data

US 2008/0286456 A1    Nov. 20, 2008

Related U.S. Application Data

(63) Continuation of application No. 11/619,634, filed on Jan. 4, 2007, now Pat. No. 7,440,657.

(30) Foreign Application Priority Data

Jan. 6, 2006  (JP) .............................. 2006-001087

(51) Int. Cl.
*G02B 6/00*       (2006.01)

(52) U.S. Cl. ....................................... 385/38

(58) Field of Classification Search ....................... None
See application file for complete search history.

(56) References Cited

U.S. PATENT DOCUMENTS

| 3,888,266 A | 6/1975 | Weldon et al. |
| 3,974,312 A | 8/1976 | Stevens et al. |
| 4,505,539 A | 3/1985 | Auracher et al. |
| 4,512,281 A | 4/1985 | Yamanishi et al. |

(Continued)

FOREIGN PATENT DOCUMENTS

JP          61-207463           9/1986

(Continued)

OTHER PUBLICATIONS

European Search Report in Application No. 07300701.5-1524, dated May 10, 2007.

(Continued)

*Primary Examiner*—Mike Stahl
(74) *Attorney, Agent, or Firm*—Wood, Herron, Evans, LLP

(57) ABSTRACT

The present invention provides a process for producing an optical connector, an apparatus for producing the same, and a process for forming a polymer coating film on an end face of a fibrous dielectric, which can dispose a refractive index adjuster only onto an end face of an optical transmitting medium with excellent reproducibility. Such a process includes bringing an end surface of the optical transmitting medium close to an end face of a liquid refractive index adjuster, while charging at least one of the optical transmitting medium and the liquid refractive index adjuster, thereby adhering the liquid refractive index adjuster to the end face of the optical transmitting medium, and thereafter solidifying the adhered liquid refractive index adjuster to obtain the refractive index adjuster.

5 Claims, 5 Drawing Sheets

U.S. PATENT DOCUMENTS

| | | | |
|---|---|---|---|
| 4,807,959 A | 2/1989 | Berkey | |
| 4,919,510 A | 4/1990 | Hoke et al. | |
| 5,066,091 A | 11/1991 | Stoy et al. | |
| 5,583,668 A | 12/1996 | Smith et al. | |
| 6,105,571 A | 8/2000 | Coffee | |
| 6,280,799 B1 | 8/2001 | Okabe et al. | |
| 6,368,409 B1 | 4/2002 | Borsuk et al. | |
| 6,947,643 B2 | 9/2005 | Takiguchi et al. | |
| 7,440,657 B2 * | 10/2008 | Furue et al. | 385/38 |
| 2005/0208863 A1 | 9/2005 | Yamazaki et al. | |

FOREIGN PATENT DOCUMENTS

| | | |
|---|---|---|
| JP | 63066510 | 3/1988 |
| JP | 64-65512 | 3/1989 |
| JP | 02-113211 | 4/1990 |
| JP | 03-020703 | 1/1991 |
| JP | 03-025403 | 2/1991 |
| JP | 5-157943 | 6/1993 |
| JP | 07-195046 | 8/1995 |
| JP | 08-337442 | 12/1996 |
| JP | H09-166706 | 6/1997 |
| JP | 2000-509835 | 2/2000 |
| JP | 2000-122429 | 4/2000 |
| JP | 2000-509835 | 8/2000 |
| JP | 2002-372690 | 12/2002 |
| JP | 2004-014868 | 1/2004 |
| JP | 2005-033072 | 2/2005 |
| JP | 2005-134447 | 5/2005 |
| JP | 2005-173575 | 6/2005 |
| KR | 10-1999-0079497 | 11/1999 |
| KR | 10-2003-0055053 | 7/2003 |
| WO | 97/42534 | 11/1997 |
| WO | 99-24857 A1 | 5/1999 |
| WO | 00-30125 A1 | 5/2000 |
| WO | 03-032018 A2 | 4/2003 |

OTHER PUBLICATIONS

Chinese Patent Office, Chinese Office Action in counterpart Chinese Application No. 200710001539.9, issued Apr. 18, 2008, 6 pages.

Korean Patent Office, Korean Office Action in counterpart Korean Patent Application No. 10-2006-0127248, issued Jun. 30, 2008, 3 pages.

Japanese Patent Office, Japanese Office Action in corresponding JP Application No. 2006-001087 issued Jun. 23, 2009, 4 pages.

* cited by examiner

PROCESS FOR PRODUCING OPTICAL CONNECTOR, APPARATUS FOR PRODUCING THE SAME, AND PROCESS FOR FORMING POLYMER COATING

CROSS-REFERENCE TO RELATED APPLICATION

This application is a continuation of U.S. patent application Ser. No. 11/619,634, entitled "Process for Producing Optical Connector, Apparatus for Producing the Same, and Process for Forming Polymer Coating," filed Jan. 4, 2007 (pending), which claims priority to Japanese Patent Application No. 2006-001087, filed Jan. 6, 2006, the content of which are incorporated herein by reference.

BACKGROUND OF THE INVENTION

1. Field of the Invention

The present invention relates to a process for producing an optical connector which consists of an optical transmitting medium which is equipped with a refractive index adjuster on an end face thereof, an apparatus for producing the same, and a process for forming a polymer coating onto an end face of a fibrous dielectric.

2. Description of the Related Art

Hitherto, an optical connecter has sometimes been disposed on an end face of an optical fiber (optical transmitting medium) in order to form an optical connection with another member. When the optical connector is installed on an end face of an optical fiber, a refractive index adjuster is very often provided between an end face of an optical fiber which is contained and running through a ferrule of the optical connector and the end face of the optical fiber. As this refractive index adjuster, a liquid type or a grease type one which is applied to both end faces of the optical fibers to be connected has been disclosed in Patent documents 1 and 2 (Japanese Unexamined Patent Application, First Publication No. S64-65512, and Japanese Unexamined Patent Application, First Publication No. H5-157943), and a film type one which is inserted between both end faces of the optical fibers to be connected has been disclosed in Patent document 3 (Japanese Unexamined Patent Application, First Publication No. 2005-173575).

However, the former has a problem in that a function of the refractive index adjuster deteriorates due to the influence of temperature or vibration. On the other hand, the latter has a problem in that it is difficult to adjust the compressive force when a solid refractive index adjuster is inserted between two end faces, and there is a problem in that breakage or damage may occur in both optical fibers.

In addition, recently, the applicant has proposed a technology which includes shaping a gelatinous adhesive refractive index adjuster into a sheet, pressing an end face of an optical fiber against the refractive index adjuster sheet, and cutting off the refractive index adjuster sheet which is adhered to the end face. However, this technology has a problem in that the optical fiber may be broken when removing the optical fiber from the refractive index adjuster, or the refractive index adjuster may be adhered to a side face of the optical fiber such that the centering accuracy of the optical fiber may be affected when the optical fiber is installed to the optical connector. Moreover, there is a problem in that the process is complex, thus increasing the cost in order to improve the reproducibility by suppressing the irregularity in shape of the refractive index adjuster which is adhered to the end face of the optical fiber, and mixing of air into the interface between the end face of the optical fiber and the refractive index adjuster.

The present invention was made in view of the above circumstances, and provides a process for producing an optical connector which is capable of disposing an refractive index adjuster only at an end face of an optical transmitting medium with high reproducibility at reduced cost, and apparatus for producing the same. In addition, the present invention provides a process for forming a polymer coating on an end face of a fibrous dielectric using the same process.

SUMMARY OF THE INVENTION

As a solution to the above problems, a first aspect of the present invention is a process for producing an optical connector having a refractive index adjuster on an end face of an optical transmitting medium, comprising bringing an end surface of the optical transmitting medium close to a face of a liquid refractive index adjuster, while charging at least one of the optical transmitting medium and the liquid refractive index adjuster, thereby adhering the liquid refractive index adjuster to the end face of the optical transmitting medium, and thereafter solidifying the adhered liquid refractive index adjuster so as to produce the refractive index adjuster.

A second aspect of the present invention is the process as set forth in the first aspect of the present invention, in which the refractive index adjuster has elasticity.

A third aspect of the present invention is the process as set forth in the first aspect of the present invention, in which the refractive index adjuster has adhesiveness.

A fourth aspect of the present invention is the process as set forth in the first aspect of the present invention, in which the liquid refractive index adjuster is a solution of the refractive index adjuster.

A fifth aspect of the present invention is an apparatus for producing an optical connector having a refractive index adjuster on an end face of an optical transmitting medium, including a medium charging means for charging the optical transmitting medium, and a refractive index adjuster holding means for holding the liquid refractive index adjuster.

A sixth aspect of the present invention is the apparatus as set forth in the fifth aspect of the present invention, further including moving means for moving the end face of the optical transmitting medium and the surface of the liquid refractive index adjuster near or away from each other.

A seventh aspect of the present invention is the apparatus as set forth in the fifth aspect of the present invention in which the medium charging means is a static dielectric device constituted from an electrode and a dielectric, which holds the optical transmitting medium in a charged state.

An eighth aspect of the present invention is the apparatus as set forth in the fifth aspect of the present invention, in which the medium charging means is a static chuck which holds the optical transmitting medium in a charged state.

A ninth aspect of the present invention is the apparatus as set forth in the fifth aspect of the present invention, in which the medium charging means is a frictional charging device which holds the optical transmitting medium in a charged state.

A tenth aspect of the present invention is the apparatus as set forth in the fifth aspect of the present invention, in which the adjuster holding means has a holding mechanism which adheres the liquid refractive index adjuster and a supplier which supplies the liquid refractive index adjuster to the holding mechanism.

An eleventh aspect of the present invention is the apparatus as set forth in the fifth aspect of the present invention, in which the holding mechanism is a holding wall.

A twelfth aspect of the present invention is a process for forming a polymer coating on an end face of a fibrous dielectric, including bringing the end face of the dielectric in a charged state close to the surface of the solution of the polymer, adhering the solution of the polymer to the end face of the dielectric, and the solidifying the adhered solution of the polymer so as to form the polymer coating.

DETAILED DESCRIPTION OF THE INVENTION

Figure 1:
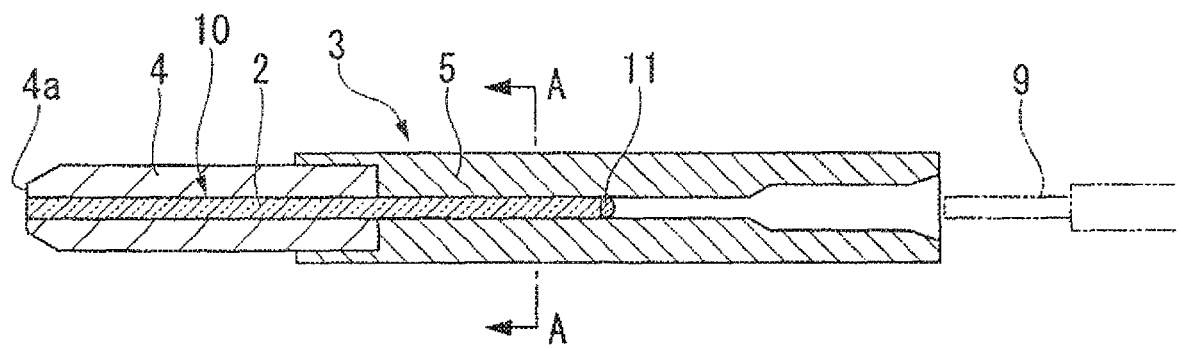
FIG. 1 is a cross-sectional view of an optical fiber with a refractive index adjuster in the embodiment of the present invention, which is cut in a plane parallel to the longitudinal direction of the optical fiber.

An explanation will be given below about embodiments of the present invention, referring to the drawings.

An optical fiber (an optical transmitting medium) 2 shown in FIG. 1 is a commonly known one which is made of quartz, resin, etc., for example. The optical fiber 2 is cut into a predetermined length and the front half thereof is passed through a ferrule 4 of an optical connecter 3, so as to be held thereby, and a front end face thereof is ground so as to be in the same plane as a front end face 4a of the ferrule 4. A rear half of the optical fiber 2 is passed through a connector main body 5 and held thereby, while disposing the ferrule 4 at a front end face of the connector main body 5. The optical fiber 2 may be referred to as a built-in optical fiber below.

Figure 2:
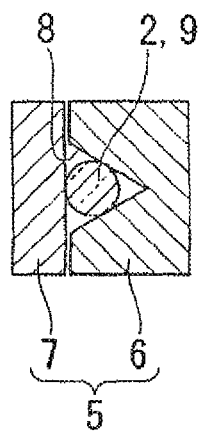
FIG. 2 is an A-A cross-sectional view of FIG. 1.

Referring to FIG. 2, the connector main body 5 consists of a V-groove plate 6 and a pushing plate 7, which are united. At the front half in the V-groove 8 of the V-groove plate 6, the rear half of the optical fiber 2 provided, and the pushing plate 7 presses the optical fiber 2 against inside the V-groove 8, so that the side face (outer periphery) of the optical fiber 2 comes into close contact with each inclined surface of the V-groove 8. By clamping the V-groove plate 6 and the pushing plate 7, centering of the optical fiber 2 to the V-groove 8 is performed.

From a rear aperture of the connector main body 5, one end of an optical fiber 9 (which may be referred to as a counterpart optical fiber, hereinafter) which is an installation partner of the optical connecter 3 is inserted, and the optical fiber 9 is accommodated at the rear half of the V-groove 8. This optical fiber 9 has the same diameter as the optical fiber 2, and is placed so as to be concentric with the optical fiber 2 by being pressed inside the V-groove 8 with the pushing plate 7 under the condition that the side face (outer periphery) of the optical fiber 9 is in close contact with each inclined surface of the V-groove 8. It should be noted that the provision of the optical fibers 2 and 9 into the V-groove 8 is performed under conditions whereby the clamp of the connector main body 5 is loosened.

Figure 3:
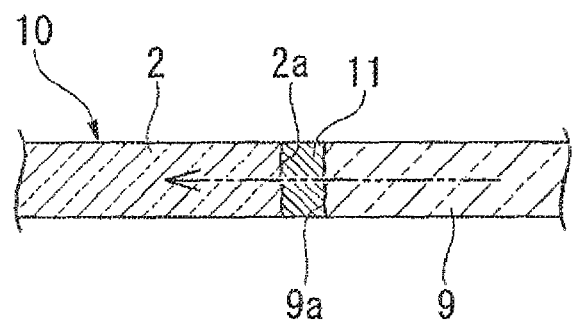
FIG. 3 is a cross-sectional view of each fiber when another optical fiber is connected to the optical fiber with a refractive index adjuster as indicated above.

Here, referring to FIG. 3, the built-in optical fiber 2 is equipped with a refractive index adjuster 11 having a refractive index matching property between the optical fibers 2 and 9, on the rear end face 2a thereof so as to provide an optical fiber with a refractive index adjuster (optical connector) 10 which enables a successful optical connection to the front end face 9a of the counterpart optical fiber 9. The refractive index adjuster 11 has elasticity and adhesiveness, and adheres closely to the end faces 2a and 9a of the optical fibers 2 and 9 so as to allow them to combine with each other. Thereby, an optical signal can be successfully transmitted, without inserting air with a different refractive index between the optical fibers 2 and 9, even if the end faces of 2a and 9a of the optical fibers 2 and 9 are left in a non-grounded state after being cut.

As the refractive index adjuster 11, a member may be used which will adhere closely to an optical transmitting medium (e.g. the optical fiber 2 or 9) or optical parts with moderate tackiness when it comes into contact with these. Preferably, a material which can be adhered to and removed from an optical transmitting medium etc., which causes no cohesive failure, and which does not leave adhesive material on an optical transmitting medium when the medium is removed can preferably be employed. Specifically, a polymer (for example, various adhesive materials such as acrylic type, epoxy type, vinyl type, silicone type, rubber type, urethane type, methacrylic type, nylon type, bisphenol type, diol type, polyimide type, fluorinated epoxy type, fluorinated acrylic type, etc.) is preferable. In particular, silicone and acrylic types are preferable, in view of the environment and adhesive property. In addition, the adhesive force and the wettability may be adjusted suitably by adding a cross-linker, an additive, a softener, or an adhesion regulator; and furthermore, water resistance, resistance against humidity and heat resistance may also be added.

In addition, in the refractive index adjuster 11, the refractive index adjustability to an optical transmitting medium etc., means the degree of an approximation between the refractive index of the refractive index adjuster 11 and the refractive index of an optical transmitting mediums. Accordingly, the refractive index of the refractive index adjuster 11 is not particularly limited, as long as it is close to the refractive index of an optical transmission medium; however, the difference between each refractive index is preferably within ±0.1, more preferably within ±0.05, in view of transmission loss by avoidance of Fresnel reflection. It should be noted that when the difference between the refractive index of the optical transmitting medium and that of the counterpart optical fiber 9 or optical parts is large, it is preferable that the difference between an average of these refractive index values and the refractive index of the refractive index adjuster 11 be within the above range.

Moreover, the refractive index adjuster 11 is constituted from a single layer. This means that there is no interface where different kinds of materials come into contact with each other such as one which consists of plural layers, and it does not exclude a system in which a material is mixed uniformly at a wavelength order of light. That is, the refractive index adjuster 11 has an extremely simple constitution which consists of a single-layer having adhesiveness, and as a result of using a member having a single layer construction, it becomes possible to connect optical transmitting media without causing reflex of light and to perform a connection with low loss.

In addition, even if there are mold flashings on the surface of optical transmitting medium, the refractive index adjuster 11 is hardly affected, and since the refractive index adjuster 11 has wettability on the surface, the refractive index adjuster 11 can be easily adhered closely to the face of the optical transmitting medium etc., and that since the refractive index adjuster II has adhesive property on the surface, the refractive index adjuster 11 can maintain adherence to optical transmitting media etc. Moreover, since an excessive pressing force does not need to be applied in order to closely adhere optical transmitting media, there is no possibility of the generation of breakage or breakdown of optical transmitting media. In addition, since the refractive index adjuster 11 has repeating releasability, it can be used repeatedly even after adhering and removing are performed plural times.

Next, an explanation will be given below about the production process of the optical fiber 10 with a refractive index adjuster.

At first, while holding the optical fiber 2 in a charged state with a static chuck 21 mentioned later, the refractive index adjuster 11 is held in the form of a solution (referred to as a liquid refractive index adjuster 12) by being mixed with a solvent.

And by bringing the end face of the optical fiber 2 having static electricity by charging close to the surface (interface) of the liquid refractive index adjuster 12, it is adhered to the end face of the optical fiber 2 by coulomb force of the static electricity, and thereafter by moving the optical fiber 2 away from the liquid refractive index adjuster 12, the liquid refractive index adjuster 12 is applied and transferred only to the end face of the optical fiber 2. By evaporating the solvent contained in the liquid refractive index adjuster in this state so as to retain the solute, a coating film of elastic- and gel-like adhesive refractive index adjuster 12 is formed onto the end face of the optical fiber 2, thereby constituting the optical fiber 10 with the refractive index adjuster 12.

Next, an explanation will be given about a production apparatus 20 for the above optical fiber 10 with a refractive index adjuster.

Figure 4:
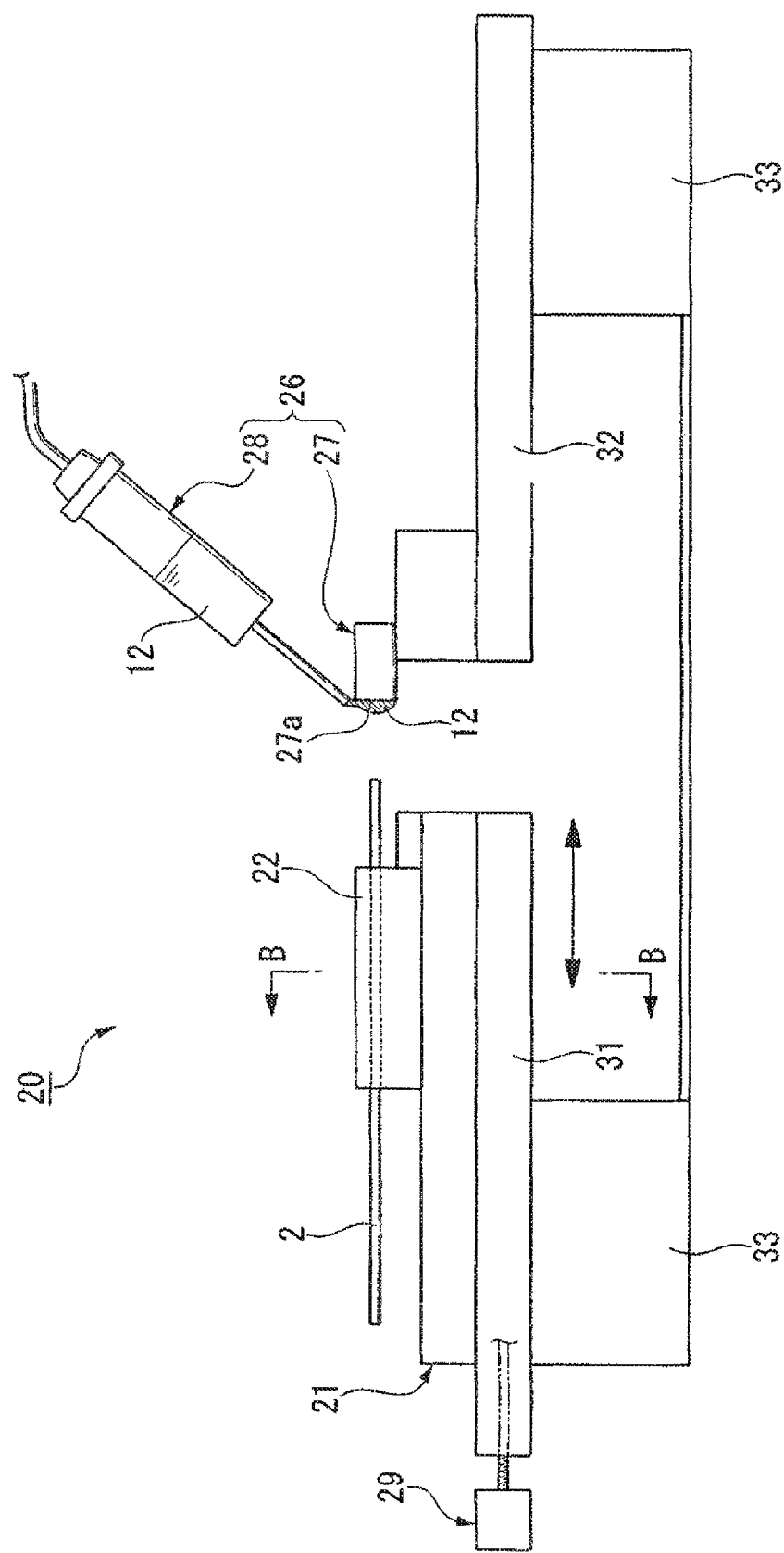
FIG. 4 is a side view of a production apparatus of the optical fiber with a refractive index adjuster as indicated above.
Figure 8:
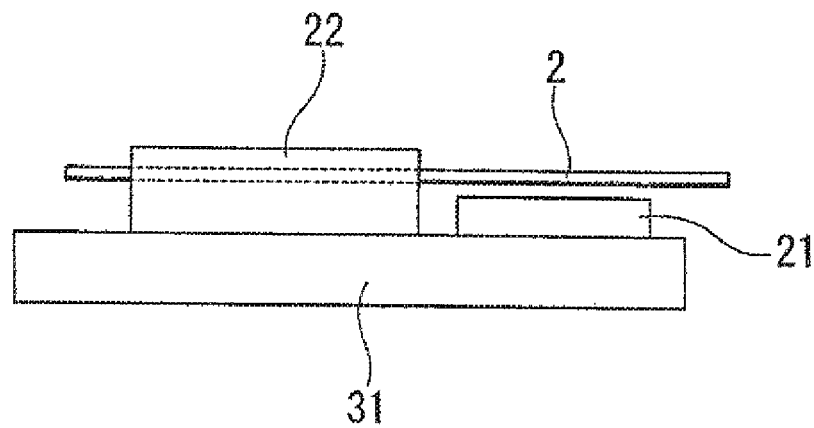
FIG. 8 is a side view which corresponds to a part of FIG. 4 which shows a modified example of the above embodiment.

As shown in FIG. 4, the production apparatus 20 is equipped with a static chuck (medium charging means) 21 which holds the optical fiber 2 by means of a holder 22 and charges the same, a holding device (adjuster holding means) 26 which holds the liquid refractive index adjuster 12 at one end side of the optical fiber 2, and a moving mechanism (relatively moving means) 29 which moves an end face of the optical fiber 2 and the surface of the liquid refractive index adjuster 12 near to or away from each other. It should be noted that the optical fiber 2 may be placed onto the static chuck 21 directly or by way of a gap suitably without using the holder 22. It should also be noted that, as shown in FIG. 8, a gap may be formed between the optical fiber 2 and the static chuck 21, by placing the holder 22 and the static chuck 21 side by side on the movable stage 31. The distance of the gap preferably ranges from approximately 100 μm to 200 μm.

Figure 5:
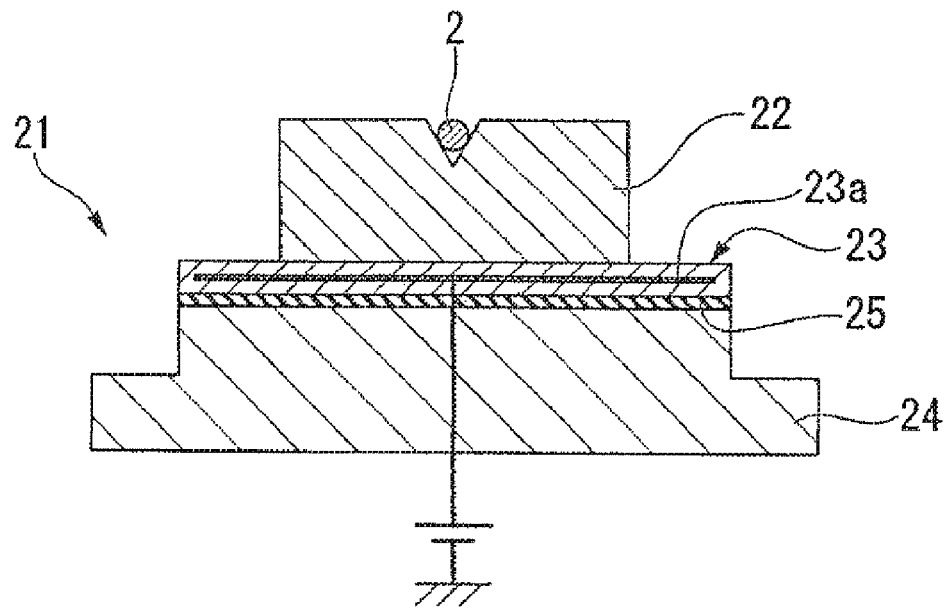
FIG. 5 is a B-B cross-sectional view of FIG. 4.

Referring to FIG. 5, the static chuck 21 is a static dielectric device which is made by adhering an electrode sheet 23 which is made by coating a print electrode sheet 23a with a dielectric such as polyimide etc., onto a metallic substrate 24 by way of a highly insulating adhesive 25. Onto the static chuck 21, the optical fiber 2 is placed by way of the holder 22. By applying a voltage to the print electrode sheet 23a, the optical fiber 2 is held by the holder 22 in a charged state. The static chuck 21 is disposed, for example, onto the movable stage 31.

A holding device 26 is constituted from a holding wall (holding mechanism) 27 which forms an opposite face 27a which is opposed to the end face of the optical fiber 2 held by the static chuck 21, and a dispenser (supplier) 28 which supplies the liquid refractive index adjuster 12 to the opposite face 27a of the holding wall 27. The dispenser 28 supplies the liquid refractive index adjuster 12, which is stored in a cylinder, onto the opposite face 27a through a nozzle. Motion of the dispenser 28 is electronically controlled by, for example, a controlling circuit, which is not shown in the drawings. The holding device 26 is disposed, for example, onto a fixed stage 32. It should be noted that although the holding wall 27, having a simple construction, is used in this embodiment as the holding mechanism for adhering the liquid refractive index adjuster 12, alternatives to a wall, such as a container or liquid stocker in a cubic or cylindrical shape, or planar or curved surface for adhering the liquid refractive index adjuster 12 may be used.

A moving mechanism 29 is disposed onto the movable stage 31 side, and the moving mechanism 29 moves the movable stage 31 along an approximately horizontal direction to a frame 33, by, for example, a combination of a motor and a ball screw mechanism, thereby moving the movable stage 31 near to or away from the fixed stage 32 fixed to the frame 33. The operation of the moving mechanism 29 is electronically controlled by the control circuit. The surfaces of the liquid refractive index adjuster 12, which is adhered to the holding wall 27, and the end face of the optical fiber 2, which is held by the static chuck 21, are moved near to or away from each other by the operation of the moving mechanism 29.

When producing the optical fiber 10 with a refractive index adjuster using the production apparatus 20 having such a constitution, at first the optical fiber 2 is placed on the holder 22, then a voltage is applied to the static chuck 21 to hold the optical fiber 2 in a charged state, and the dispenser 28 is operated so as to supply the liquid refractive index adjuster 12 to the opposite face 27a of the holding wall 27, thereby forming a new surface.

Figure 6:
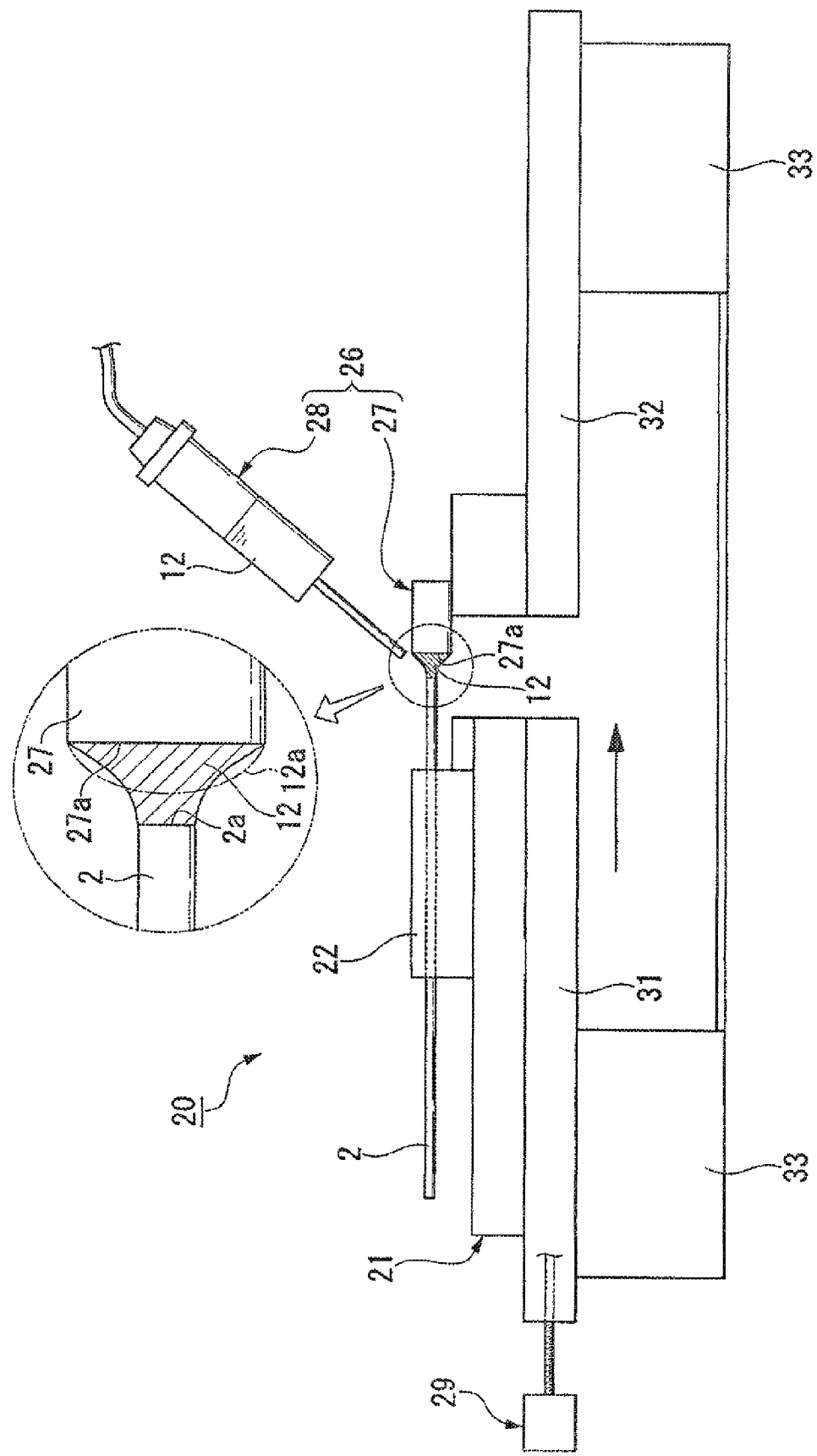
FIG. 6 is a side view which corresponds to FIG. 4 when the liquid refractive index adjuster is adhered to an end face of an optical fiber using the production apparatus.

Subsequently, as shown in FIG. 6, the movable stage 31 is moved to the fixed stage 32 side by the operation of a moving mechanism 29, so as to bring the end face 2a of the optical fiber 2 close to the surface 12a of the liquid refractive index adjuster 12 on the opposite face 27a. At that time, the liquid refractive index adjuster 12 on the opposite face 27a is drawn by the coulomb force of the static electricity charged on the optical fiber 2, and as a result the surface 12a is adsorbed by the end face 2a of the optical fiber 2. It should be noted that although the optical fiber 2 and the liquid refractive index adjuster 12 were brought close to each other after the optical fiber 2 was charged in this embodiment, in contrast, the optical fiber may be charged after bringing the optical fiber 2 and the liquid refractive index adjuster 12 close to each other.

Figure 7:
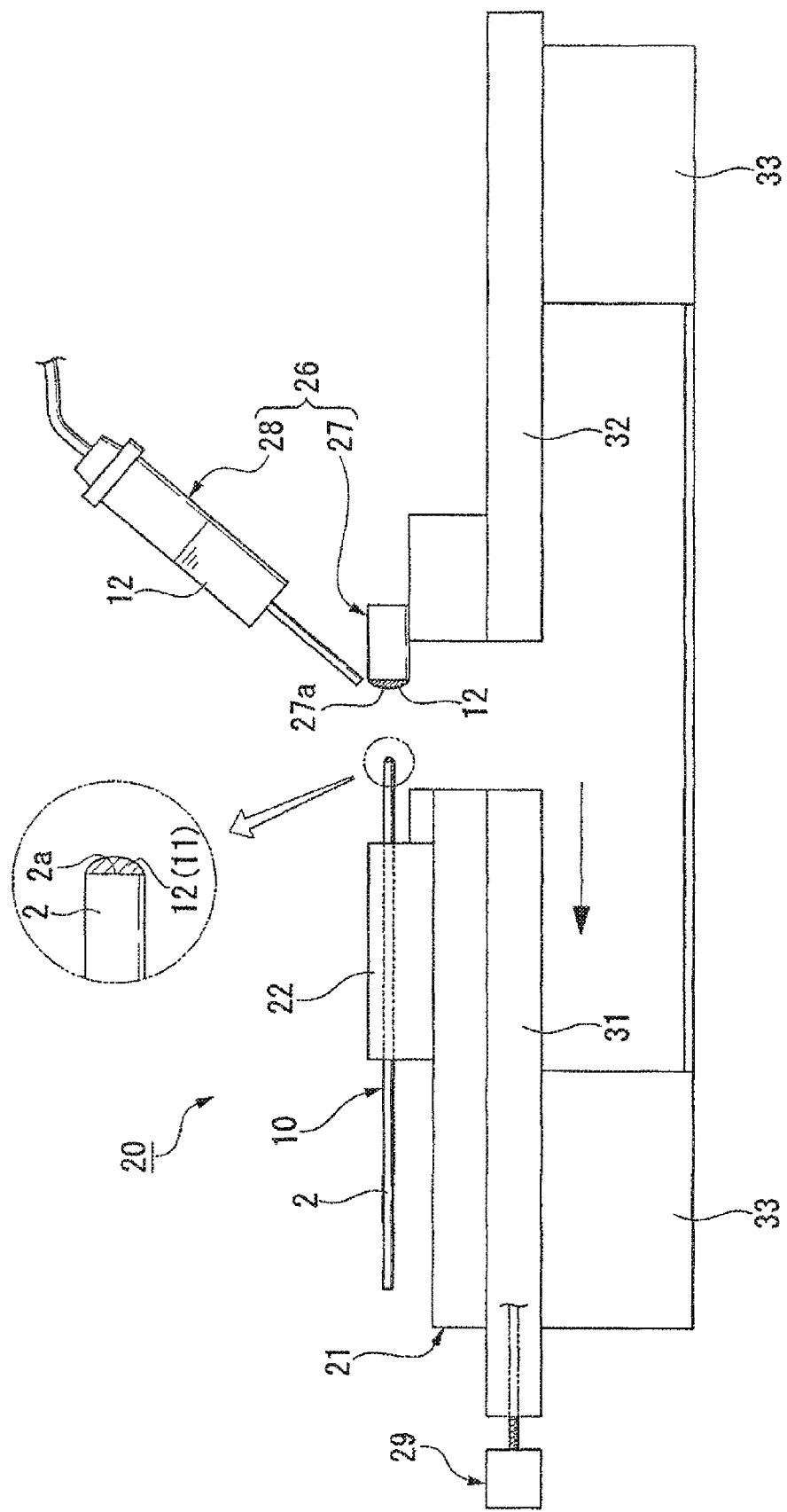
FIG. 7 is a side view which corresponds to FIG. 4 after the liquid refractive index adjuster is adhered to an end face of the optical fiber.

And thereafter, as shown in FIG. 7, the movable stage 31 is moved to an opposite side to the fixed stage 32 by the operation of the moving mechanism 29, thereby moving the end face 2a of the optical fiber 2 away from the surface 12a of the liquid refractive index adjuster 12 on the opposite face 27a, and as a result, the liquid refractive index adjuster 12 is applied and transferred to the end face 2a of the optical fiber 2. By subjecting the liquid refractive index adjuster 12 thus formed to a forced-drying to evaporate the solvent contained therein, the optical fiber 10 with a liquid refractive index adjuster in which a coating film of the refractive index adjuster 11 is formed only on the end face of the optical fiber 2 is produced.

A further explanation will be given below of an example of an optical fiber 10 with a refractive index adjuster which is produced using a production method (and the production apparatus 20) of this embodiment.

At first, as the optical fiber 2, an optical fiber core line having an outer diameter of 250 μm and a clad outer diameter of 125 μm produced by FURUKAWA DENKOH Co., Ltd. was prepared, and the coating ranging from one end thereof to 20 mm was removed to expose the optical fiber, and thereafter an optical fiber ranging from the one end to 10 mm was cut.

In addition, as the liquid refractive index adjuster 12, an acryl-based adhesive of which the refractive index had been adjusted to 1.46 corresponding to the optical fiber 2 was prepared. Specifically, a solution obtained by mixing 1.0 part of COLONATE L (produced by Nippon Polyurethane Industry Corporation, tolylene diisocyanate adduct of trimethylol propane) with 100 parts of 30% an ethyl acetate solution of acrylic resin consisting of n-butyl acrylate/methyl acrylate/acrylic acid/2-hydroxyethyl methacrylate copolymer (compounding ratio=82/15/2.7/0.3) was prepared. It should be noted that although the viscosity of the liquid refractive index adjuster 12 is not limited particularly, preferably it ranges from approximately 0.005 to 1 Pa.s.

Subsequently, the optical fiber 2 was set to the holder 22 produced by FURUKAWA DENKOH Co., Ltd. and the holder 22 was placed on the static chuck 21, and then a voltage (approximately 3 kV) was applied to the static chuck 21 to generate static electricity, the optical fiber 2 was held on the holder 22, and the optical fiber 2 was charged by way of the holder 22.

When an end face of the optical fiber 2 thus charged was brought in close contact with the surface of the liquid refractive index adjuster 12 on the holding wall 27, the liquid refractive index adjuster 12 was adsorbed to the end face of the optical fiber 2, and thereafter, as a result of moving the optical fiber 2 away from the liquid refractive index adjuster 12, the liquid refractive index adjuster having a thickness ranging from approximately 5 to 50 μm (actual value) was applied and transferred to the end face of the optical fiber 2.

Thus, the liquid refractive index adjuster 12 was adhered to the end face of the optical fiber 2, and then the resultant optical fiber 2 was heated in an oven at a temperature of approximately 70° C. for 1.5 hours to evaporate the solvent contained in the liquid refractive index adjuster 12, thereby forming a coating film of the elastic and adherent refractive index adjuster 11 only to the end face of the optical fiber 2.

When the refractive adjuster 11 (actual thickness of 15.7 μm) and the end face of the counterpart optical fiber 9 that has just been cut (not ground) were placed against each other and connected, the reflection loss was 51.4 dB, and the splice loss (of optical fiber) ranged from 0.1 to 0.2 dB.

It should be noted that although the static chuck 21, which is a typical static dielectric device using an electric field, was used in this embodiment, if a frictional charging device such as a rotating frictional device etc. where to be used, then the same result would be obtained.

As mentioned in the above, the process for producing the optical fiber 10 with a refractive index adjuster in the above embodiment includes bringing the end face of the optical fiber 2, which is in a charged state, close to the surface of the liquid refractive index adjuster (a solution of polymer) 12 to adhere the liquid refractive index adjuster 12 to the end face of the optical fiber 2, and then solidifying the adhered liquid refractive index adjuster 12 to form the refractive index adjuster 11.

In accordance with the above constitution, the end face of the optical fiber 2 and the surface of the liquid refractive index adjuster 12 were brought close to each other to adhere the liquid refractive index adjuster 12 only to the end face of the optical fiber 2, and thereafter the liquid refractive index adjuster 12 was solidified to obtain the refractive index adjuster 11, thereby making it unnecessary to perform strict positioning (aligning) of the optical fiber 2 to simplify the process and effectively prevent mixing of air into the interface between the end face of the optical fiber 2 and the refractive index adjuster 11.

Moreover, since the refractive index adjuster 11 is formed only to the end face of the optical fiber 2, the centering accuracy when installing the optical fiber 2 into the optical connector 3 can be secured, and hence a favorable optical connection between the optical fibers 2 and 9 to be connected can be realized.

Moreover, the adhered amount of the liquid refractive index adjuster 12 to the end face of the optical fiber 2 can be controlled by adjusting the charging amount of the optical fiber 2, the moving amount of the optical fiber 2 to the surface of the liquid refractive index adjuster 12, and the viscosity of the liquid refractive index adjuster 12, and hence it becomes easy to stabilize the shape and thickness of the refractive index adjuster 11, and as a result, it is possible to form the refractive index adjuster 11 with excellent reproducibility and reduce the cost by simplifying the process.

In addition, since the refractive index adjuster 11 is disposed at the end face of the optical fiber 2, the occupied area becomes very small, and as a result, the degree of freedom in designing can be improved, the adhesive refractive index adjuster 11 will not soil the side face of the optical fiber 2, and dust from the environment will not be adhered. Moreover, since the refractive index adjuster 11 has a single construction, reflection of light will not occur therein. In addition, since it is not necessary to newly dispose any special holding means for holding the refractive index adjuster 11, downsizing of space can be accelerated and installing thereof to an existing optical connector is easy.

Moreover, in the above production process, since the refractive index adjuster 11 has elasticity and adhesiveness, the refractive index adjuster 11 flexibly deforms corresponding to the shape of the end face of the optical fibers 2 and 9, such that the refractive index adjuster 11 is closely adhered to the end face to prevent air entering into the interface between the optical fibers 2 and 9, and this closely adhering state can be favorably maintained, thereby it becomes possible to perform an optical connection at a low loss while not using the grinding process of the end face, and to perform plural optical connections due to the restoring force thereof.

Here, in the above production apparatus 20 for the optical fiber with a refractive index adjuster, as the means for charging the optical fiber 2, the static chuck 21 which holds the optical fiber 2 in a charged sate is used, thereby it becomes possible to perform charging and holding of the optical fiber 2 by only placing the optical fiber 2 thereon, and the cost reduction can be performed due to simplifying the apparatus per se and the process.

Moreover, in the above production apparatus 20, the means for holding the liquid refractive index adjuster 12 is constituted from the holding wall 27, which adheres the liquid refractive index adjuster 12, and the dispenser 28, which supplies the liquid refractive index adjuster to the holding wall 27, thereby it becomes possible to keep the surface of the liquid refractive index adjuster 12 always fresh, such that the solidification of the surface is avoided and that the liquid refractive index adjuster 12 can be favorably adhered to the end face of the optical fiber 2.

It should be noted that the present invention is not limited to the above embodiment, for example, in the present invention, each of the charging means for charging the optical fiber 2 and the holding means for holding the optical fiber 2 may be disposed independently, the moving means for relatively moving the end face of the optical fiber 2 and the surface of the liquid refractive index adjuster 12 and the supplying means for supplying the liquid refractive index adjuster 12 to the holding wall may be a hand-operated one, it may be constituted such that the liquid refractive index adjuster 12 is moved to the optical fiber 2, and it may be constituted such that the optical fiber 2 and the liquid refractive index adjuster 12 are perpendicularly moved near to or away from each other. At this time, the means for holding the liquid refractive index adjuster 12 may be constituted, for example, such that the liquid refractive index adjuster 12 drops to a horizontal holding plane, or such that the liquid refractive index adjuster is stored in a container.

In addition, it is also possible to apply and transfer the liquid refractive index adjuster 12 to a plurality of optical fibers en block and uniformly. Moreover, since the liquid refractive index adjuster 12 is a solution of the refractive index adjuster 11, the cost can be reduced by simplifying the process when solidifying the liquid refractive index adjuster 12. Moreover, since the liquid refractive index adjuster 12 is disposed onto the end face of the optical fiber 2, the vaporability of the solvent increases such that the liquid refractive index adjuster 12 is easily solidified.

In the above embodiment, although the optical fiber has been charged in advance, the liquid refractive index adjuster may be charged in advance. Moreover, the constitution in the above embodiment is an example; in other words, the present invention is applicable to optical transmitting media, optical parts other than an optical fiber and to the process for forming a polymer coating onto a fibrous dielectric such as glass, ceramic, plastic, etc.; and needless to say that various modifications can be performed as long as they do not deviate from the spirit of the present invention.

In accordance with the first, the fifth, and the sixth aspects of the present invention, the end face of the optical transmitting medium and the surface of the liquid refractive index adjuster are relatively moved with respect to each other so as to adhere the liquid refractive index adjuster only to the end face of the optical transmitting medium, and then the liquid refractive index adjuster is solidified to form a refractive index adjuster, and hence strict alignment of the optical transmitting media becomes unnecessary to simplify the process, and mixing of air into the interface between the end face of the optical transmitting medium and the refractive index adjuster can be effectively prevented.

Moreover, since the refractive index adjuster is formed only on the end face of the optical transmitting medium, accuracy of centering when the optical transmitting medium is installed into the optical connector can be secured, and as a result, successful optical connection between optical transmitting media to be connected can be realized.

Moreover, it becomes possible to adjust the adhering amount of the liquid refractive index adjuster onto the optical transmitting medium, by adjusting the charging amount of the optical transmitting medium and moving the amount thereof to the surface of the liquid refractive index adjuster, and the viscosity of the liquid refractive index adjuster, and hence the shape and thickness of the refractive index adjuster become easily stabilized, and as a result, it becomes possible to form the refractive index adjuster at the end face of the optical transmitting medium with high reproducibility and reduce cost by simplifying the process.

In accordance with the second aspect of the present invention, the refractive index adjuster corresponds to the shape of the end face of the optical transmitting medium such that it can be adhered closely to the end face of the optical transmitting medium, and entry of air when connecting one optical transmitting medium to another optical transmitting medium can be presented; thereby realizing successful optical connection.

In accordance with the third aspect of the present invention, it becomes possible to maintain a closely adhered state when connecting one optical transmitting medium with another optical transmitting medium; thereby optical connection can be maintained in a favorable state.

In accordance with the fourth aspect of the present invention, the process of solidifying the liquid refractive index adjuster can be simplified, and as a result, cost can be reduced further. Moreover, since the liquid refractive index adjuster is disposed on the end face of the optical transmitting medium, vaporability of solvent is improved to promote the solidification.

In accordance with the seventh, the eighth, and the ninth aspects of the present invention, both of the charging and the holding of the optical transmitting medium become possible by only disposing an optical transmitting medium on the apparatus, and hence the cost can be reduced by simplifying the apparatus per se and the process.

In accordance with the tenth and the eleventh aspect of the present invention, the surface of the liquid refractive index adjuster can be kept fresh constantly, and it is possible to adhere the liquid refractive index adjuster onto the end face of the optical transmitting medium favorably by preventing the solidification of the surface.

In accordance with the twelfth aspect of the present invention, entry of air into the interface between the fibrous dielectric and the polymer coating is prevented, thereby simplifying the process.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for producing an optical connector having a refractive index adjuster on an end face of an optical fiber, comprising a medium charging means for charging the optical fiber, and a refractive index adjuster holding means for holding the liquid refractive index adjuster.

2. The apparatus for producing an optical connector as set forth in claim 1, further comprising moving means for moving the end face of the optical fiber and the surface of the liquid refractive index adjuster near to or away from each other.

3. The apparatus for producing an optical connector as set forth in claim 1, wherein said medium charging means is a static dielectric device constituted from an electrode and a dielectric, which holds the optical fiber in a charged state.

4. The apparatus for producing an optical connector as set forth in claim 1, wherein said adjuster holding means has a holding mechanism which adheres the liquid refractive index adjuster, and a supplier which supplies the liquid refractive index adjuster to the holding mechanism.

5. The apparatus for producing an optical connector as set forth in claim 4, wherein said holding mechanism is a holding wall.

\* \* \* \* \*